April 18, 1967     B. I. ULINSKI     3,315,058

MOTOR CONTROLLER FOR AN INDUSTRIAL TRUCK

Original Filed April 10, 1961     3 Sheets-Sheet 1

INVENTOR.
B. I. ULINSKI
BY Teagno & Toddy
ATTORNEY

April 18, 1967 B. I. ULINSKI 3,315,058
MOTOR CONTROLLER FOR AN INDUSTRIAL TRUCK
Original Filed April 10, 1961 3 Sheets-Sheet 2
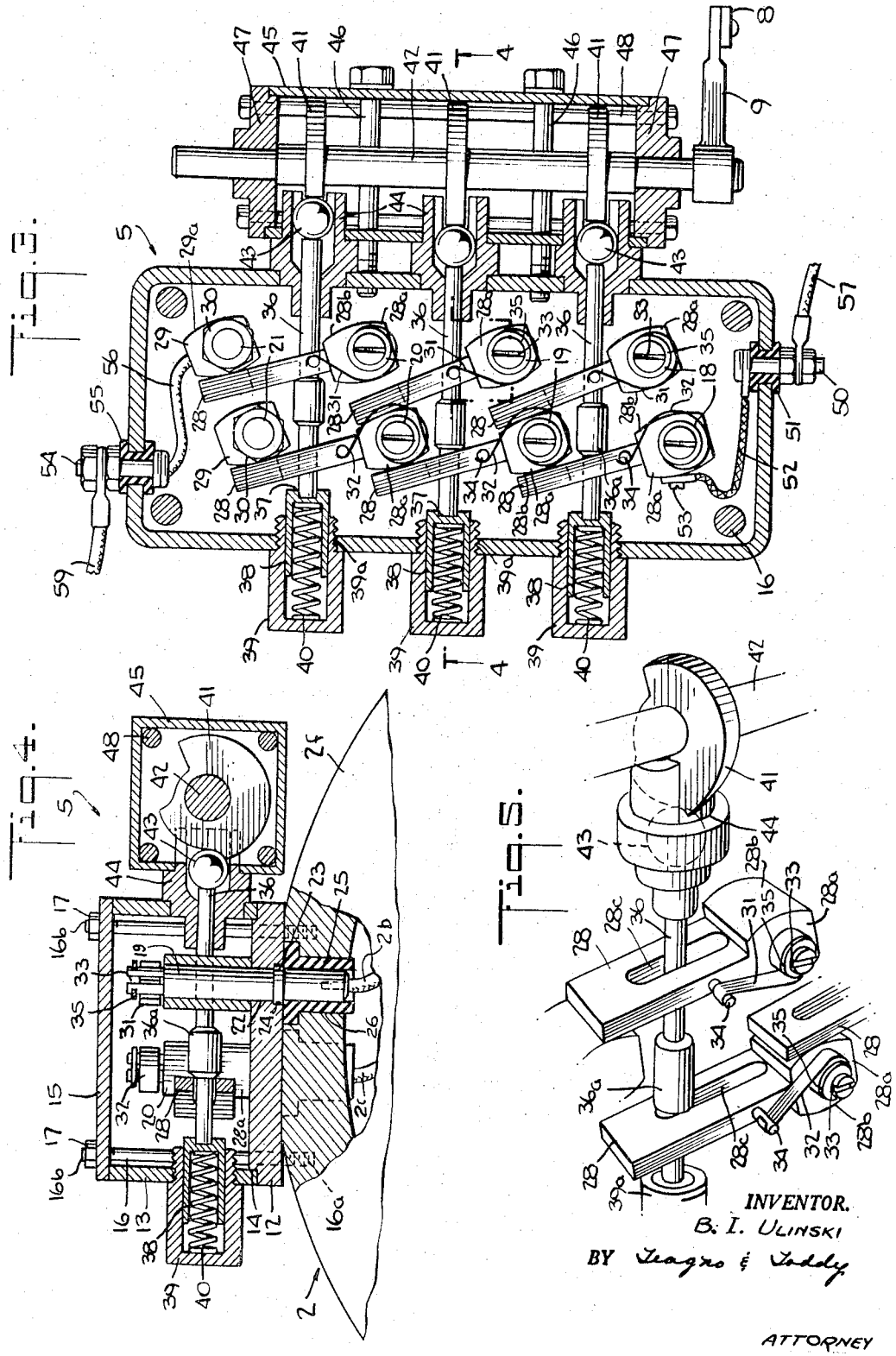
INVENTOR.
B. I. ULINSKI
BY Teagno & Toddy
ATTORNEY

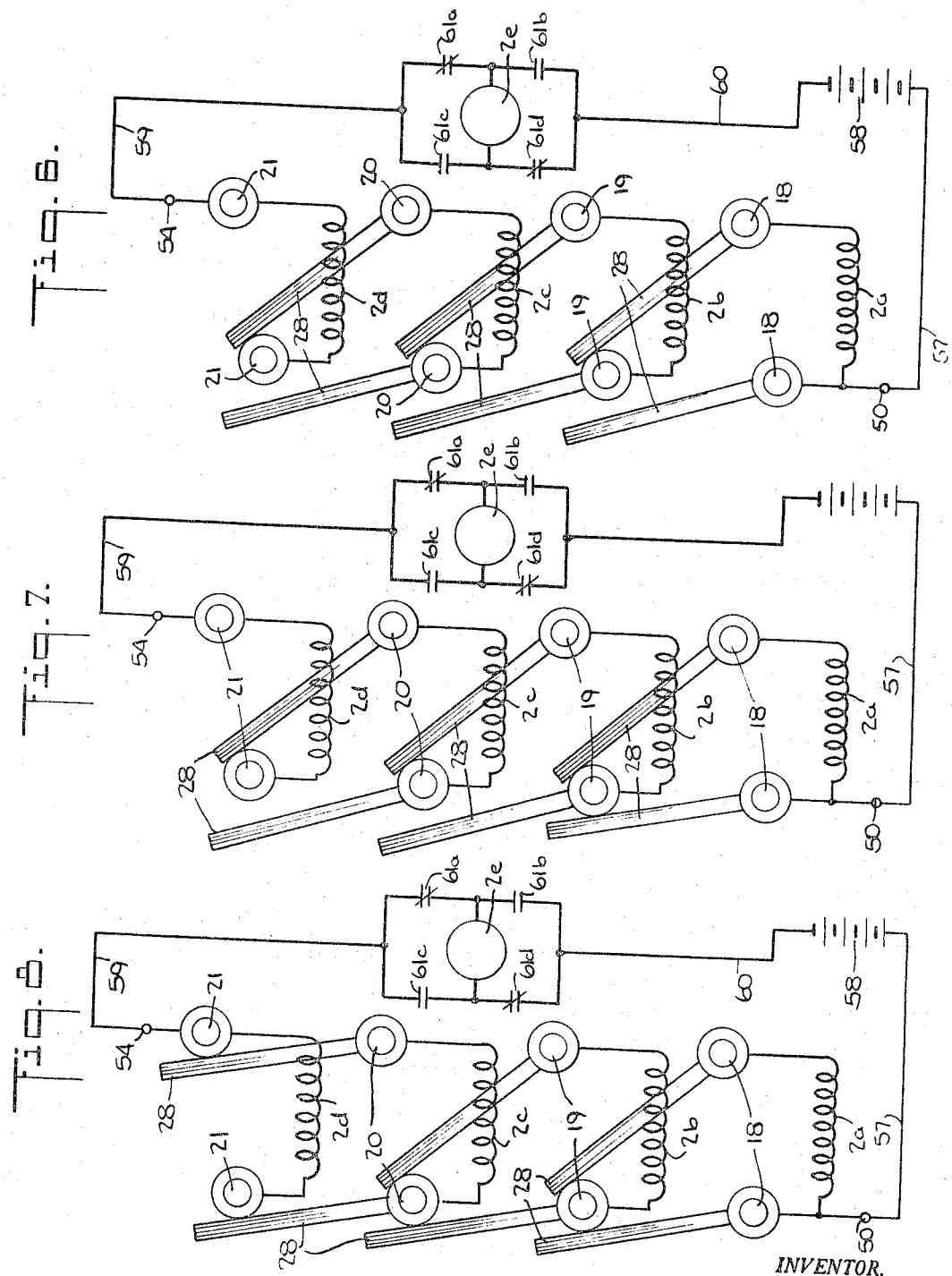

United States Patent Office 3,315,058
Patented Apr. 18, 1967

3,315,058
MOTOR CONTROLLER FOR AN INDUSTRIAL TRUCK
Bronislaus I. Ulinski, Jenkintown, Pa., assignor to Eaton Yale & Towne Inc., Cleveland, Ohio, a corporation of Ohio
Application Feb. 12, 1965, Ser. No. 436,989, which is a continuation of application Ser. No. 101,705, Apr. 10, 1961. Divided and this application Mar. 14, 1966, Ser. No. 534,190
8 Claims. (Cl. 200—153)

This application is a division of my application Ser. No. 436,989, which was filed Feb. 12, 1965, as a continuation of my application Ser. No. 101,705, filed Apr. 10, 1961, now abandoned.

This invention relates to an electrically operated industrial truck, and in particular to a controller for the electric traction motor of the truck.

Various control systems have heretofore been proposed and used which incorporate various types of controllers or switch devices for varying the speed of the motor by varying the resistance or the arrangement of the field windings in the motor circuit. Each of these systems, however, has required rather elaborate, complicated wiring systems which necessarily added to the cost of fabrication and maintenance of the truck, as well as special consideration of the design of the mechanical components of the truck, in order to accommodate and protect the wiring system.

The purpose of this invention is to provide a controller for the traction motor of an industrial truck which is mechanically extremely simple and requires only a very simple wiring system thereby eliminating the fabrication and maintenance problems inherent in the use of prior control systems.

In accordance with the invention, the speed of the traction motor is controlled by connecting separate field windings for the motor into the motor circuit in various combinations by means of a controller which is mounted directly on the outer surface of the traction motor and is connected with the field windings through openings provided in the motor housing. A suitable linkage system is provided connecting the controller with manually operable means, such as a foot treadle or hand lever, positioned adjacent the operator's compartment so that the controller may be easily actuated by the operator of the truck to vary the speed of the motor. By this arrangement, the wiring of the control system is greatly simplified thereby facilitating fabrication and maintenance of the truck. Furthermore, as the wiring of the control system is enclosed within the motor housing and the controller housing, it is well protected.

As a feature of the invention, there is provided a very simple, relatively inexpensive, extremely compact controller which is particularly adapted for use on an industrial truck because it occupies relatively little space and may be readily secured directly to the motor housing. Furthermore, the controller is so designed as to maintain continuity of the motor circuit during connection and disconnection of the field windings, so that electrical arcing is minimized and smoother operation is obtained then would be the case if the motor circuit were completely broken each time a field winding were connected or disconnected.

The invention and its advantages having been broadly described, a more detailed description of one embodiment of the invention is given hereafter by reference to the accompanying drawings wherein:

FIG. 3 is a sectional view of a controller constructed in accordance with the invention.

FIG. 4 is a sectional view taken on the line 4—4 of FIG. 3 and showing the controller secured to the side of the housing of the electric traction motor.

FIG. 5 is a perspective view showing one pair of contact fingers and the actuating mechanism for the fingers;

FIG. 6 is a diagrammatic showing of the controller and traction motor circuit with the contact fingers of the controller positioned to connect four field windings of the motor in series to give a first motor speed;

FIG. 7 is a diagrammatic showing similar to that of FIG. 4 but showing the contact fingers positioned to short out one field winding coil while connecting the other three field windings in series to give a higher motor speed; and FIG. 8 is a diagrammatic showing similar to that of FIGURE 5 but showing the contact fingers positioned to short out two field windings and to connect two field windings in parallel to give a still higher motor speed.

Figure 1:
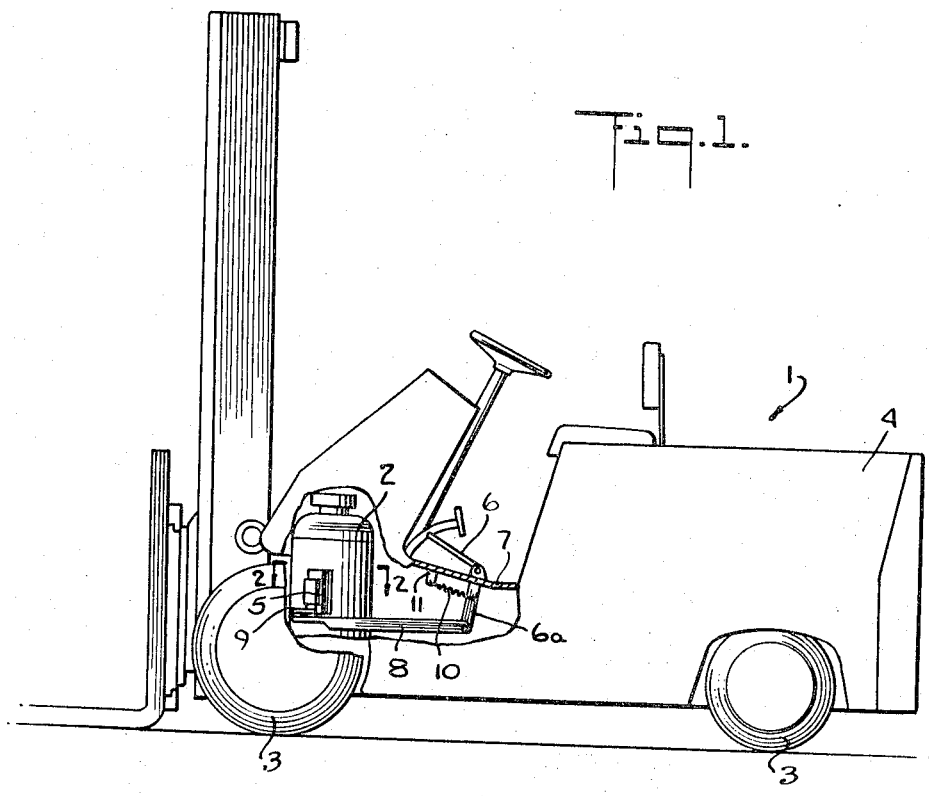
FIG. 1 is a side elevational view of an industrial truck with parts broken away to show the incorporation of the controller of the invention in the truck.
Figure 2:
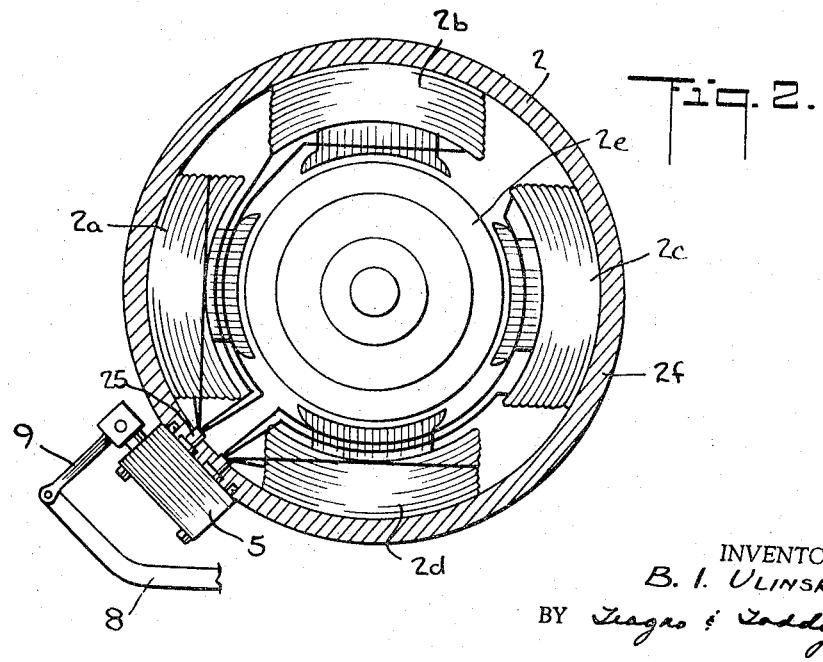
FIG. 2 is a section view taken on line 2—2 of FIG. 1 to show the connection of the field windings of the traction motor with the controller.

Referring to the drawings and in particular to FIG. 1, the controller of the invention is shown incorporated in an industrial truck 1 having an electrical traction motor 2 for driving front wheels 3, and having a compartment 4 for housing batteries for supplying electrical energy to the motor 2. As best shown in FIG. 2, the traction motor has four separate field windings 2a, 2b, 2c and 2d, which surround an armature 2e.

In accordance with the invention, the speed of the motor is varied by connecting the field windings into the motor circuit in various combinations by means of a controller 5 which is secured directly to the outer surface of the housing 2f of the motor 2 and is connected to the field windings through openings in the housing 2f.

The controller 5 is adapted to be actuated to vary the speed of the motor 2 by means of a foot treadle 6 which is pivotally mounted on the floor 7 of the operator's compartment of the truck and is connected to the controller 5 by means of a link 8 which is pivotally secured at one end to an operating lever 9 of the controller 5, and pivotally secured to the other end to an extension 6a and a lug 11 secured to the floor 7 serves to urge the treadle 6 and controller 5 to neutral position.

It can be seen by this arrangement for controlling the speed of the motor 2, only a very simple wiring system is required thereby simplifying fabrication and maintenance of the truck while at the same time insuring that the wiring system is well protected.

Referring to FIGS. 3 and 4, the controller 5 includes a main housing conveniently formed in three parts, including a base 12 formed of suitable rigid insulating material, a hollow rectangular frame 13 which seats in a peripheral groove 14 in the base 12 and forms the four sides of the housing, and a cover plate 15. The resulting housing is secured to the outer surface of the housing 2f of the motor 2 by means of four corner studs 16 which have threaded inner ends 16a which extend through the base 12 and thread into the motor housing 2f to clamp the base 12 to the motor housing. The studs 16 also have outer threaded ends 16b which extend through the corners of the cover plate 15 and receive nuts 17 for holding the cover plate 15 and the frame 13 assembled on the base 12.

Four pairs of spaced terminal posts 18, 19, 20 and 21 having each a flange 23 intermediate its ends, as best shown in FIG. 4, extend into the controller housing through holes 22 provided in the base 12, and extend in the opposite direction through bushings 25 formed of suitable insulating material which line openings 26 provided through the motor housing 2f. When the controller is secured to the motor housing 2f by means of the studs 16, the flanges 23 of the terminal posts 18, 19, 20 and 21 seat in counterbores 24 formed in the ends of the holes 22, and the flanges 23 are clamped between the base 12 and the outer surface of the bushings 25 so that the terminal posts are retained in proper position. As diagrammatically shown in FIG. 6, each of the field windings 2a, 2b, 2c and 2d of the electric motor 2 is connected between the terminals of one pair of the four pairs of terminal posts 18, 19, 20 and 21. As best shown in FIGS. 2 and 4, the ends of the field windings are conveniently connected to the inner ends of the terminal posts which extend through the bushings 25.

Each of the terminal posts of the pairs of terminal posts 18, 19 and 20 is provided with a pivotally mounted contact finger 28 which includes a hub portion 28a which is rotatably mounted on the terminal posts within the frame 13.

The contact finger 28 mounted on each of the terminal posts 18, 19 and 20 on the right-hand side of the controller, as viewed in FIG. 3, extends between the next adjacent pair of terminal posts immediately above so that it can pivot between a position of physical contact with the hub portion 28a of the contact fingers 28, or contact blocks 29 in the case of terminal posts 21, mounted on either the left-hand or right-hand terminal post of the next adjacent pair of terminal posts to form an electrical circuit between the terminal posts. Thus, the contact finger 28 mounted on the right-hand terminal post 18 extends between the pair of terminal posts 19 and may be moved into physical contact with the hub portion 28a of the contact finger 28 mounted on either the left-hand or right-hand terminal post 19. The contact finger 28 mounted on the right-hand terminal post of the pair of terminal posts 19 extends between terminal posts 20 and may be moved into physical contact with the hub portion 28a of the contact finger 28 mounted on either the left-hand or right-hand terminal post 20. Similarly, the contact finger 28 mounted on the right-hand terminal post 20 extends between the pair of terminal posts 21 and may be moved into physical contact with the contact block 29 mounted on either the left-hand or right-hand terminal post 21.

Each of the contact fingers 28 mounted on the left-hand terminal post extends to the left of the left-hand terminal post of the next adjacent pair of terminal posts immediately above, as viewed in FIG. 3, and can be moved into or out of physical contact only with the hub portion 28a of the contact fingers 28 or the contact block 29 mounted on the left-hand terminal posts of the next adjacent pair of terminal posts.

The outer surfaces 28b of the hub portion 28a and the outer surfaces 29a of the contact blocks 29 are preferably convexed so that the fingers 28 make substantially uniform line contact therewith regardless of the pivotal position of the hub portions 28a or fingers 28. The contact blocks 29 are conveniently clamped in position on the terminal posts 21 by nuts 30 threaded on the outer ends of the terminal posts 21.

The contact fingers 28 mounted on the right-hand terminal posts 18, 19 and 20 are urged to the left toward the left-hand terminal posts of the next succeeding pairs of terminal posts, by means of coil springs 31, while the contact fingers 28 mounted on the left-hand terminal posts 18, 19 and 20 are urged to the right toward the same left-hand terminal posts by coil springs 32. As best seen in FIGS. 4 and 5, the inner ends of the springs 31 and 32 extend through slots 33 provided in the outer ends of the upper and lower terminal posts 18, 19 and 20 and the outer ends of the springs 31 and 32 are hooked around pins 34 which extend from the edge of each of the fingers 28 so as to urge the fingers 28 toward the left-hand terminal posts. The springs 31 and 32, as well as the fingers 28, are retained on their respective terminal posts 18, 19 or 20 by suitable split retaining clips 35 which seat in grooves provided in the ends of the terminal posts, as can best be seen in FIG. 4.

The fingers 28 mounted on the left and right-hand terminal posts of each of the pairs of terminal posts 18, 19 and 20 are adapted to be moved away from the left-hand terminal posts against the force of the springs 31 or 32 associated therewith by means of an actuating rod 36 formed of suitable insulating material. As best shown in FIG. 5, the actuating rods 36 extend through elongated slots 28c provided in each of the contact fingers 28 of each pair of terminal posts, and each rod 36 has an enlarged portion 36a which is positioned between the left and right-hand fingers 28. Thus, if the actuating rod 36 is moved to the left, the contact finger 28 mounted on the left-hand terminal post is engaged by the enlarged portion 36a and is moved out of electrical contact with the left-hand terminal post of the next adjacent pair of terminal posts. If the actuating rod 36 is moved to the right, the enlarged portion 36a thereof engages the finger 28 mounted on the right-hand terminal post and moves the finger out of electrical contact with the left-hand terminal post of the next adjacent pair of terminal posts into electrical contact with the right-hand terminal post. It will be noted that the actuating rods 36 can move only the right-hand contact finger 28 or the left-hand contact finger away from the left-hand terminal post at one time so that one finger 28 is always in contact with each of the left-hand terminal posts to maintain a circuit through the controller at all times.

The left-hand end of each of the actuating rods 36 engages in a seat 37 formed in the end surface of a hollow plunger 38 which is slidably received in a hollow spring seat 39. Each of the spring seats 39 has a threaded end 39a which is threaded through the wall of the frame 13 to secure the seat 39 to the controller. A compression spring 40 is disposed in each of the spring seats 39 with the right-hand end of the spring 40 bearing against the inner surface of the plunger 38 and the left-hand end of the spring 40 bearing against the inner bottom surface of the spring seat 39 so as to urge the plunger 38 and the actuating rod 36 associated therewith to the right. The strength of the spring 40 is made greater than that of the spring 31 so that the springs 40 acting through the plunger 38 and actuating rods 36 can move the control fingers 28 of the right-hand terminal posts away from the left-hand terminal posts against the force of the springs 31.

The positions of the control rods 36 and, therefore, the positions of the contact fingers 28 are controlled by cams 41 of a predetermined contour which are secured to a rotatably mounted shaft 42. Each of the cams 41 engages a cam follower in the form of a ball 43 which in turn engages the top of one of the rods 36. As the cams 41 are rotated, the rods 36 are either moved to the left against the force of the springs 40 by the cams 41, or moved to the right by the springs 40, to vary the positions of the contact fingers 28.

The right-hand ends of the rods 36 and the balls 43 are guided in suitable guide sleeves 44 which extend between the frame 13 and the wall of a housing 45 which encloses the cams 41. The housing 45 is secured to the frame 13 by means of bolts 46 which extend through the housing 45 and thread into the frame 13. The shaft 42 is supported for rotation in bearings 47 which are provided at each end of the housing 45 and are held in position by means of through bolts 48. The shaft 42 is adapted to be rotated by means of the lever 9 which is secured to one end thereof and, as previously described, is connected to the foot treadle 6 by link 8, whereby movement of the foot treadle rotates the shaft 42 and the cams 41 to change the positions of the contact fingers 28.

The lower end of the frame 13 (FIG. 3) is provided with a terminal 50 which extends through a suitable insulating grommet 51 and is connected by means of a flexible connector 52 to the hub portion 28a of the contact finger 28 mounted on the left-hand terminal post 18 by a screw 53, and the upper end of frame 13 is provided with a terminal 54 which extends through an insulating grommet 55 and is connected to the right-hand terminal posts 21 by a connector 56. The terminals 50 and 54 and the two connections 52 and 56 are all that are required to connect the controller in the motor circuit.

As previously stated, each of the separate field windings 2a, 2b, 2c and 2d of the motor 2 is connected between the terminals of one of the pairs of terminals 18, 19, 20 and 21, and the speed of the motor is controlled by changing the positions of the contact fingers 28 to vary the number of the field windings which are connected in the motor circuit, and the manner in which they are connected in the circuit. The peripheral contours of the cams 41 are so selected that as the cams 41 are rotated, the contact fingers 28 will be moved to vary the number and manner of connection of the field windings in the motor circuit in such a sequence that the speed of the motor will be increased step by step as the cams are rotated in one direction.

This varying of the speed of the motor by movement of the contact fingers to vary the number and combination in which the field windings of the motor are connected in the motor circuit is best illustrated in the diagrams of FIGS. 6, 7 and 8. In these diagrams, the four separate field windings 2a, 2b, 2c and 2d of the D.C. motor 2 are shown connected respectively between the terminals of each pair of the terminal posts 18, 19, 20 and 21. The lower end side of the controller is shown connected through the terminal 50 to a lead 57 from a source of D.C. electrical energy, such as the battery 58, and the upper end of the controller is shown connected through the terminal 54 to a lead 59 to one side of the armature 2e of the D.C. motor. A lead 60 connects the other side of the armature 2e to the battery 58. Contacts 61a, 61b, 61c and 61d represent the contacts of a conventional starting and reversing switch. In the diagrams, the contacts 61a and 61d are shown closed to complete a circuit in one direction through the armature 2e.

FIG. 6 illustrates a first speed position of the contact fingers 28 in which the fingers 28 mounted on the right-hand terminal posts 18, 19 and 20 are in electrical contact with the left-hand terminal posts 19, 20 and 21, and the fingers 28 mounted on the left-hand terminal posts have been moved out of electrical contact with the left-hand terminal posts 19, 20 and 21 by the enlarged portions 36a of the actuating rods 36 through movement of the rods 36 to the left by the cams 41. In this position of the fingers 28, the field windings 2a, 2b, 2c and 2d are connected in series with the armature 2e to provide low speed operation of the motor.

In FIG. 7, there is shown a second speed position in which the finger 28 mounted on the left-hand post 18 has been moved by its spring 32 to the right into electrical contact with the left-hand terminal post 19 due to release of lower actuating rod 36 by its cam 41 to allow sufficient movement thereof to the right by its spring pressed plunger 38 to release the finger 28 for such movement. This movement of the lower actuating rod 36 is insufficient to move the finger 28 on the right-hand post 18 out of electrical contact with the left-hand terminal 19, so that this finger remains in the same position as in FIG. 6. The other contact fingers 28 also remain in the same position as in FIG. 6. The movement of the one finger 28 shorts out the field winding 2a while field windings 2b, 2c and 2d remain connected in series so as to increase the speed of the motor.

A third higher speed position (not shown in the drawings) may be obtained by moving the contact finger 28 mounted on the left-hand terminal post 19 into electrical contact with the left-hand terminal post 20 so as to short out field winding 2b in addition to field winding 2a, so as to leave only field windings 2c and 2d connected in series in the circuit. A fourth higher speed may be obtained by moving contact finger 28 mounted on the left-hand terminal post 20 into electrical contact with the left-hand terminal post 21 to short out field winding 2c in addition to field windings 2b and 2a so as to leave only field windings 2d in the circuit.

A fifth speed may be obtained by movement of the contact fingers to the position shown in FIG. 8 in which all the left fingers 28 are in electrical contact with the left-hand terminal posts 19, 20 and 21, while uppermost rod 36 has moved uppermost contact finger 28 on the right-hand terminal post 20 into electrical contact with the right-hand terminal post 21. Field windings 2a and and 2b are now shorted out, and field windings 2c and 2d are connected in parallel. The positions of the fingers 28, as shown in FIG. 8, are the same as that shown in FIG. 3.

A sixth higher speed may be obtained by moving the contact finger 28 mounted on the right-hand terminal post 19 from the position of electrical contact with the left-hand terminal post 20 as shown in FIG. 8 to a position of electrical contact with the right-hand terminal post 20 whereby field windings 2b, 2c and 2d are connected in parallel, and field winding 2a is shorted out. A seventh higher speed may be obtained by also moving the contact finger 28 mounted on the right-hand terminal post 18 from the position as shown in FIG. 6 to a position of electrical contact with the right-hand terminal post 19 so that all the field windings 2a, 2b, 2c and 2d are connected in parallel.

Thus, through the control of rods 36 and the operating portions 36a, it is possible to position the spring pressed fingers 28 into varying combinations so as to connect the fields into various electrical combinations to obtain a great number of motor speeds.

As previously stated, the peripheral contours of the cams 41 are selected and related so as to give the proper sequence of positions of the contact fingers 28 to provide a gradual step-by-step increase in the speed of the motor as the shaft 42 is rotated in one direction, and to give a gradual step-by-step decrease in the motor as the shaft 42 is rotated in the opposite direction to return it to its original position.

It will be noted thta due to the location of the enlargements 36a of the actuating rods 36 between the pairs of contact fingers 28 at least one contact finger 28 of each pair of terminals is at all times in electrical contact with one of the next adjacent pairs of terminals, as the field windings are connected and disconnected, so that the continuity of the motor circuit is maintained with resulting decrease in electrical arcing and smoother operation than would be the case if the motor circuit were broken each time that a field winding was connected or disconnected.

It will also be noted that the controller requires very few different parts. Thus, each of the contact fingers 28, the terminal posts 18, 19 and 20, springs 31 and 32, actuating rods 26, balls 43, guides 44, plungers 37, spring seats 39 and springs 40 are identical thereby decreasing the number of different necessary parts and the cost of the controller, as well as simplifying the construction of the controller.

From the preceding description, it can be seen that there is provided an improved control system and controller for the traction motor of an industrial truck which eliminates the complicated wiring arrangement of systems heretofore used so as to simplify the fabrication and maintenance of the truck. While a preferred form of the invention has been shown and described, it will be appreciated that changes and modifications may be made thereon without departing from the spirit and scope of the invention.

I now claim:

1. A controller comprising, at least two pairs of spaced terminals, a contact finger pivotally mounted on each terminal of one pair of terminals, one contact finger being pivotally movable into and out of electrical contact with one terminal of the other pair of terminals, the other contact finger being pivotally movable between positions of electrical contact with both terminals of the other pair of terminals, and means for selectively pivoting said fingers to three different positions of electrical contact with said terminals of said other pair of terminals including a first position in which both said contact fingers are in electrical contact with said one terminal of the other pair of terminals, a second position in which said one contact finger is out of electrical contact with said one terminal of the other pair of terminals and said other contact finger is in electrical contact with said one terminal of said other pair of terminals, and a third position in which said one contact finger is in electrical contact with said one terminal of said other pair of terminals and said other contact finger is in electrical contact with said other terminal of said other pair of terminals, whereby elements connected between each of said pair of terminals may be connected in parallel, in series, or certain elements shorted out.

2. A controller as set forth in claim 1, and including means urging both of said contact fingers toward said first position of said fingers, and manually operated means coacting with said contact fingers for placing said fingers in their second and third positions.

3. A controller as set forth in claim 1, and including spring means pressing both of said contact fingers to said first position of said fingers, means coacting with each finger for moving the finger against its spring pressure, and manually operated cam means controlling said coacting means so as to place said contact fingers in their second and third positions.

4. A controller comprising, a series of pairs of spaced terminals, a contact finger pivotally mounted on each terminal of each pair of terminals except for an end pair of terminals of the series, one contact finger of each pair of terminals being pivotally movable into and out of a position of electrical contact with one terminal of the next adjacent pair of terminals, and means for pivoting said pair of terminals being pivotally movable between positions of electrical contact with both terminals of the next adjacent pair of terminals, and means for pivoting said fingers of each pair of terminals through a sequence of different positions of electrical contact with said next adjacent pair of terminals, including a position in which both said contact fingers are both in contact with one terminal of said next adjacent pair of terminals, a position in which said one contact finger is out of contact with said one terminal of said next adjacent pair of terminals and said other finger is in contact with said one terminal of said next adjacent pair of terminals and a position in which said one contact finger of said one pair of terminals is in contact with said one terminal of said next adjacent pair of terminals and said other contact finger is in contact with said other terminal of said next adjacent pair of terminals, whereby to first connect elements connected between each of said pair of terminals all in series, then progressively short out all but one element and finally progressively connect all the elements in parallel.

5. A controller comprising a first housing, a plurality of spaced terminals operably mounted in said housing, contact fingers rotatably mounted on said spaced terminals, said contact fingers movable between a first and second position, actuating means for moving said contact fingers between said first and second positions, first means for moving said actuating means in a first direction for moving said contact fingers into said first position, a second housing associated with the first housing, second means enclosed in said second housing and opposing said first means for moving said actuating means in a second direction whereby said actuating means imparts a force to said contact fingers for movement into said second position.

6. In a controller of the character described in claim 5 wherein said actuating means comprises a plurality of rod members which extend through said contact fingers, an enlarged portion on each of said control rods for engaging said contact fingers whereupon movement of said control rods will actuate said contact fingers.

7. In a controller of the character described in claim 5 wherein said first means for moving said actuating means comprises a biasing spring mounted in said first housing and in axial alignment with said actuating means.

8. In a controller of the character described in claim 5 wherein said second means comprises a cam shaft having a plurality of cams mounted thereon, linkage means attached to said cam shaft for imparting rotary motion thereto, follower means intermediate said cams and said actuating means whereby rotary movement of said cam shaft imparts linear motion to said actuating means thereby overcoming said first means and thereby moving said control fingers into said second position.

References Cited by the Examiner
UNITED STATES PATENTS 2,579,135    12/1951    Alexander          200—153

ROBERT K. SCHAEFER, *Primary Examiner.*

H. HOHAUSER, *Assistant Examiner.*